Feb. 9, 1971     J. L. WOODS ET AL     3,561,244
APPARATUS FOR FORMING OPENINGS IN TUBULAR PANELS
Filed Aug. 12, 1968     4 Sheets-Sheet 2
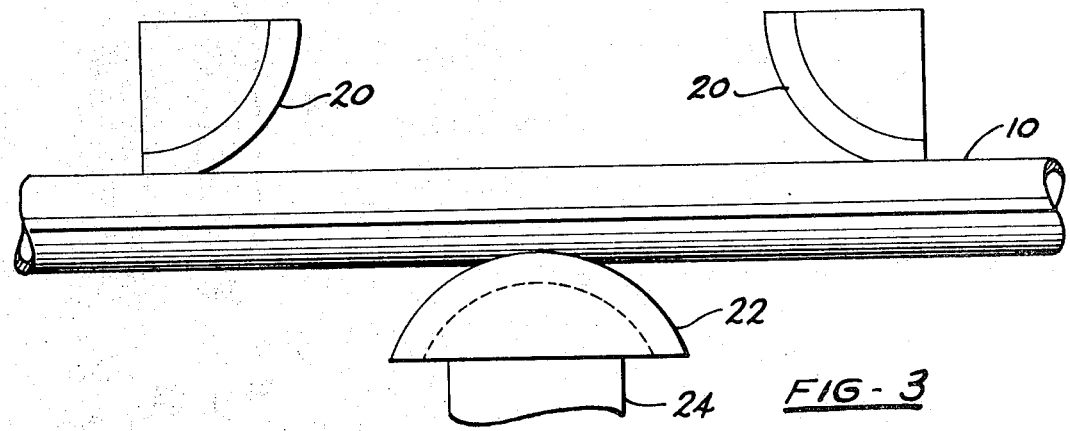
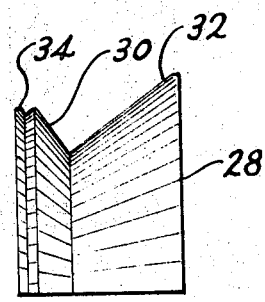
FIG-4a
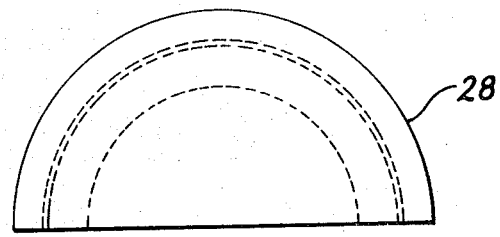
FIG-4b
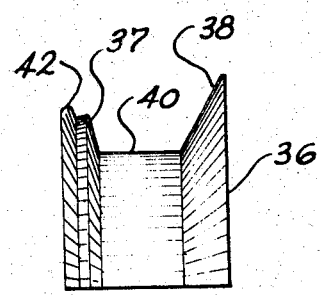
FIG-4c
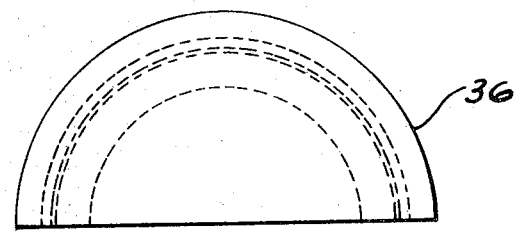
FIG-4d
INVENTOR.
KENNETH B. GARNER
JACK L. WOODS
BY
Lawrence P. Kessler
ATTORNEY United States Patent Office 3,561,244
Patented Feb. 9, 1971

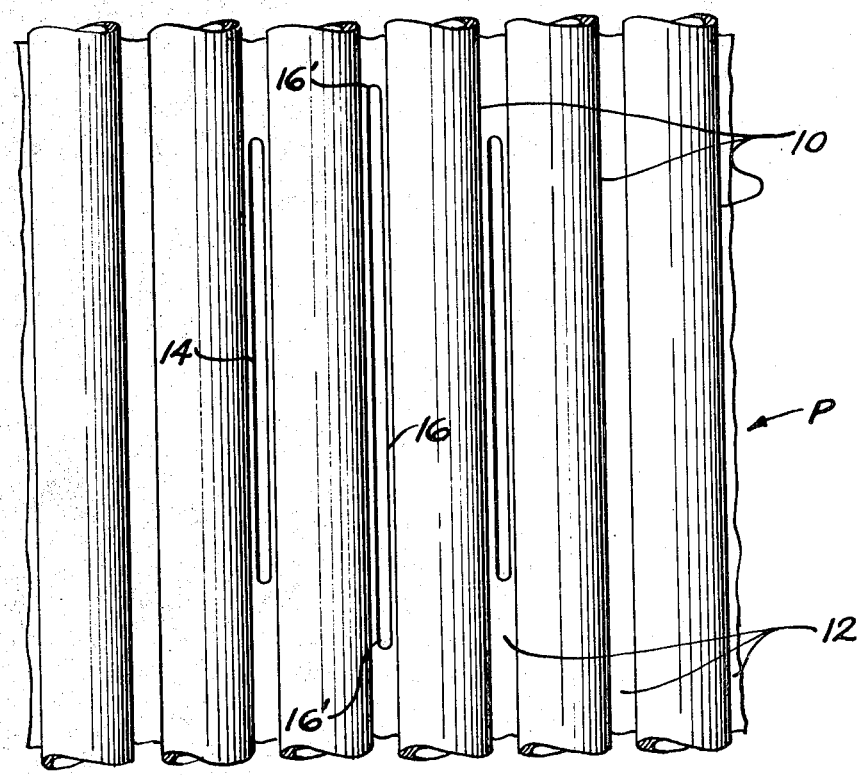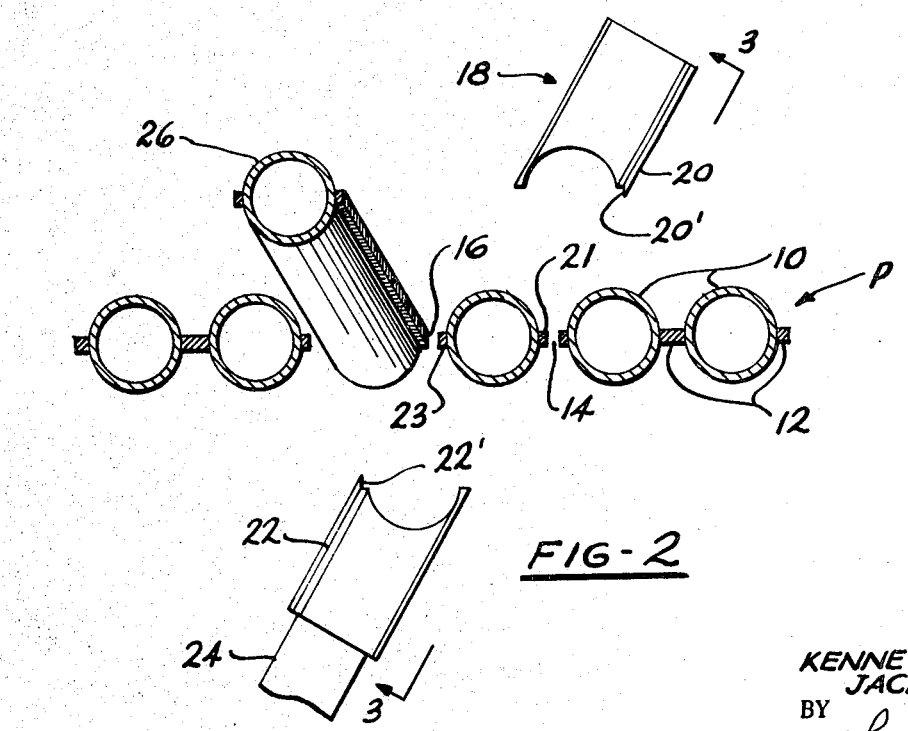

3,561,244
APPARATUS FOR FORMING OPENINGS IN
TUBULAR PANELS
Jack L. Woods and Kenneth B. Garner, Chattanooga,
Tenn., assignors to Combustion Engineering, Inc.,
Windsor, Conn., a corporation of Delaware
Filed Aug. 12, 1968, Ser. No. 751,808
Int. Cl. B21d 43/28, 53/02; B21k 21/00
U.S. Cl. 72—324
3 Claims

ABSTRACT OF THE DISCLOSURE

An apparatus for forming openings in tubular welded wall panels particularly used for lining furnace walls of steam generators. An adjustable guide arrangement is oriented with respect to the tubes in the tube panel between which the opening is to be formed so as to guide the tubes upon movement thereof out of the plane of the panel. Hydraulic jacks located on the opposite side of the panel from the guide arrangement alternately force shaped dies against complementary shaped portions of the guide arrangement to stretch and bend therebetween the tubes of the panel to form the desired opening without deforming the displaced tubes.

BACKGROUND OF THE INVENTION

This invention relates to an apparatus for forming openings in tubular welded wall panels used in lining furnace walls and more particularly to an apparatus for forming openings in tubular welded wall panels according to the method set forth in co-pending U.S. application No. 751,782 filed Aug. 12, 1968, to Kenneth B. Garner and Robert G. Ives and assigned to the same assignee as the instant invention.

Prior methods of forming openings in tubular welded wall panels used in steam generator furnaces were costly, time consuming, and expensive. As described in application No. 751,782 prior methods of forming the many necessary openings in tubular wall panels required preforming of tubes before forming the welded wall panels, or removing segments of welded wall tube panels and welding short preformed inserts into the removed area. The first method utilizes complex and specified welding machine while the second method requires costly, time consuming hand welding.

SUMMARY OF THE INVENTION

The apparatus of this invention avoids the disadvantages of the above mentioned methods for forming openings and tubular welded wall panels by operating on panels formed in the standard manner without requiring the welding of additional preformed open sections thereto. A standard type welded wall tube panel is passed beneath an adjustable guide arrangement after having segmeans of this invention; FIG. 4b is a side elevation of the panel about the tubes between which the opening is to be formed. The guide arrangement serves to guide the tubes when moved out of the plane of the panel controlling the curvature thereof while limiting flattening and thinning of the tubes. Hydraulic jacks located opposite the side of the tube panel from the guide arrangement, alternately force shaped dies against complementary shaped portions of the guide arrangement in order to operate on the tubes therebetween. The die and guide arrangement stretch and bend the tubes in a controlled manner to form the opening in the tubular welded wall panel. By selection of particular complementary shapes for the guide and complementary die, and by controlling the angle at which the dies operate upon the tubes, openings can be efficiently and economically formed with a limited deformation (flattening and thinning) of the displaced tubes.

BRIEF DESCRIPTION OF THE DRAWINGS

FIG. 1 is a front elevation of a typical tubular welded wall panel having segments of the interconnecting web portions removed; FIG. 2 is a cross sectional view of a tube panel oriented between the tube bending means of this invention, showing one tube in its bent position; FIG. 3 is a view of the bending means of this invention taken substantially along the lines 3—3 of FIG. 2 showing the die and guides in their tube engaging position; FIG. 4a is a perspective view of a modified bending means of this invention; FIG. 4b is a side elevation of the bending means of FIG. 4a; FIG. 4c is a perspective view of another modified form of the bending means of this invention; FIG. 4d is a side elevation of the bending means of FIG. 4c.

DETAILED DESCRIPTION OF THE PREFERRED EMBODIMENT

Figure 5:
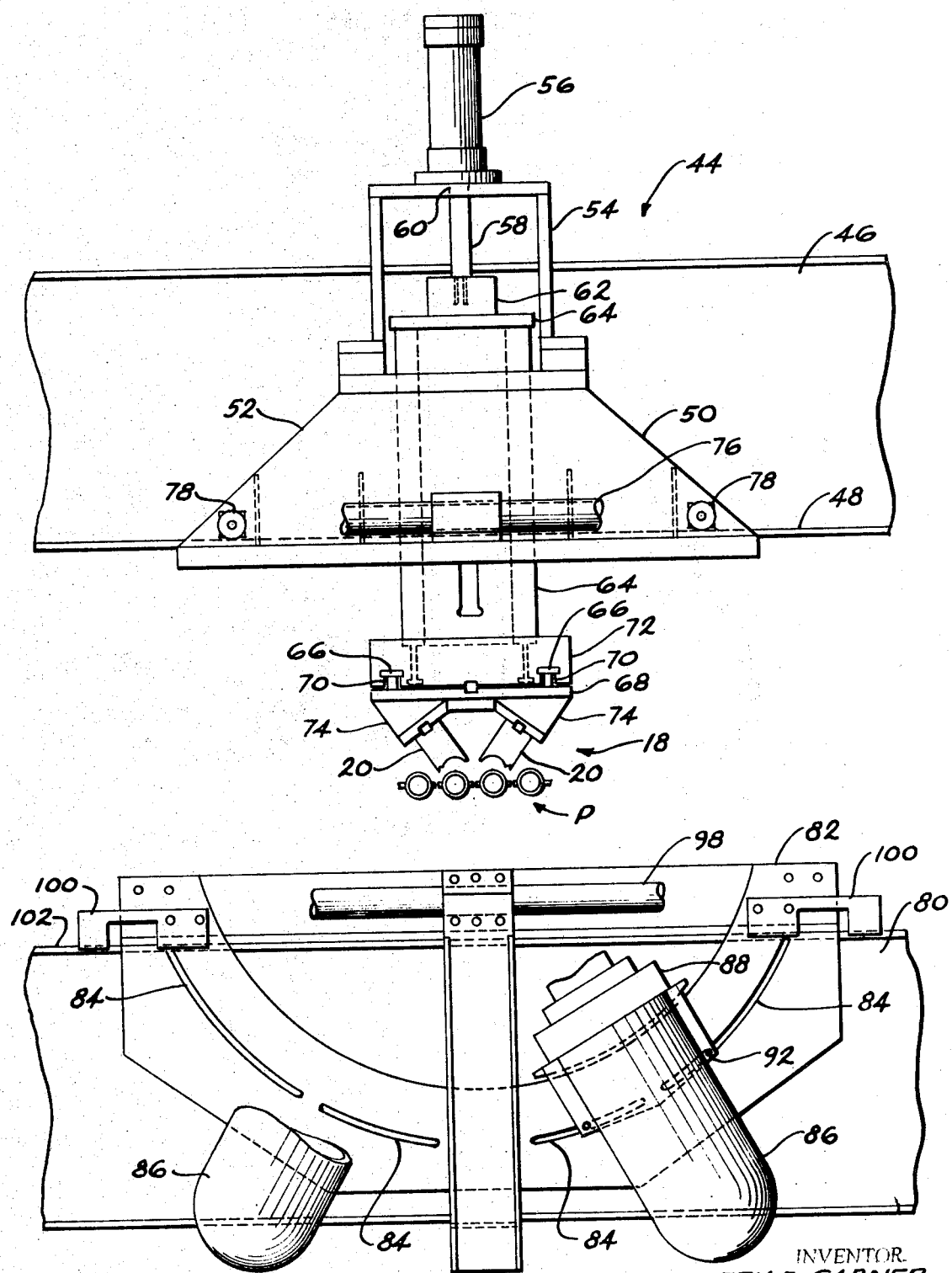
FIG. 5 is a front elevation with portions, removed for simplicity, of the apparatus of this invention.

Referring now to the drawings, FIG. 1 shows a tubular wall panel P consisting of fluid carrying tubes 10 interconnected by welded web portions 12. Segments (14, 14', and 16) of the web portions 12 surrounding the tubes between which the opening is to be formed are removed. The central removed segment 16 has a length which extends beyond the equivalent length of the side removed segments 14, 14', as at 16'.

The tubes of the panel P are displaced from the plane of the panel to form the openings therein by means of complementary shaped guide and die arrangements. The guide arrangement 18 consists of grooved roller guides 20 oriented above the panel P. The grooved roller guides 20 are shaped to conform to the circumference of the tube which it is to guide and furthermore has a notched groove 20' mating with the remaining flange 21 of the removed segment 14. A grooved die portion 22 actuated by the die support 24 of a hydraulic jack is oriented on the opposite side of the panel so that the guide roller 20 and the die member 22 will act upon the tube to be displaced in a manner as described herein and below. The grooved die 22 is also shaped to conform to the circumference of the tube to be displaced and has a notched groove 22' mating with the remaining flange 23 of the central removed segment 16. FIGS. 2 and 3 show the particular orientation of one grooved roller guide 20 of the guide arrangement 18 and the complementary shaped grooved die 22 for cooperation therewith. Furthermore FIG. 2 shows one tube 26 bending out of the plane of the panel P so as to form one-half of the desired opening.

FIGS. 4a, 4b, 4c, and 4d show several modifications of the roller member which may be used as the complementary guides and dies. Roller 28 (FIGS. 4a, and 4b) has an angular groove having sloping side walls 30, 32 meeting at an apex. Adjacent the shorter of the side walls is the notched groove 34 for accommodating the remaining flange of a removed segment. The modified roller 36 has sloping side walls 37, 38 joined by a flat portion 40. Once again the shorter of the two side walls has an adjacent groove 42 to accommodate the remaining flange of a removed segment. By selecting one of these particular shapes, the bending and stretching actions preformed upon the tubes of the panel P to form the opening therein may be accomplished with only limited amount of thinning and flattening thereof.

Figure 6:
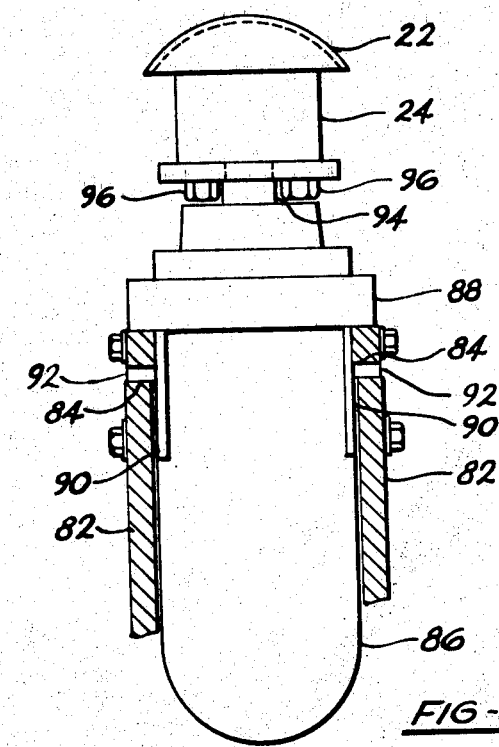
FIG. 6 is a side elevation of the hydraulic jack of FIG. 5.

FIGS. 5 and 6 show the overall arrangement of the apparatus 44 of our invention to preform the forming of the desired openings in the tubular welded wall panels P. The upper frame 46 has a track means 48 upon which a guide arrangement carriage 50 is mounted for longitudinal movement. The guide arrangement carriage 50 comprises a supporting housing 52 for actuating cylinder mounting 54. An actuating cylinder 56 is fixed to the mounting 54 and has a rod 58 extended through an opening 60 in the mounting 54. The cylinder rod 58 is fixed to a block 62 which supports a guide arrangement supporting frame 64.

The guide arrangement 18 it attached to the guide arrangement supporting frame 64 by means of T bars 66 fixed to the base 68 of the guide arrangement 18. These T bars ride in grooves 70 formed in a support block block 72 attached to the guide arrangement supporting frame 64. The guide arrangement 18 further comprises angular blocks 74 upon which grooved guide members 20 are fixed.

The guide arrangement carriage is propelled longitudinally of the upper frame 46 by means of a rotating screw 76. The supporting housing 52 has wheels 78 mounted thereon which ride on tracks 48 to move the guide arrangement carriage 50 along the upper frame 46 when the screw 76 is rotated by any appropriate means.

Beneath the upper frame 46 is a lower frame 80 which supports cylinder support plates 82 for longitudinal movement thereon. The cylinder support plates 82 have grooved tracks 84 formed therein. Hydraulic cylinders 86 are supported between the cylinder support plates 82 (FIG. 6) by means of a cylinder support collar 88. The support collar 88 has brackets 90 extending downwardly therefrom. These brackets 90 have pins 92 extending outwardly and riding in the grooved tracks 84. Extending upwardly from the hydraulic cylinder 86 through the support collar 88 is a hydraulic cylinder piston rod 94. Attached to the piston rod 94 is the die support 24 affixed thereto by means of bolts 96. As previously noted the grooved die 22 is supported by the grooved die support 24 for actuation therewith.

Longitudinal movement of the cylinder support plate 82 is accomplished by means of the rotating screw 98. The cylinder support plates 82 has slides 100 affixed thereto which cooperate with tracks 102 of the lower frame 80. As the screw 98 is rotated cylinder support plate 82 will move longitudinally along the track 102.

Figure 7:
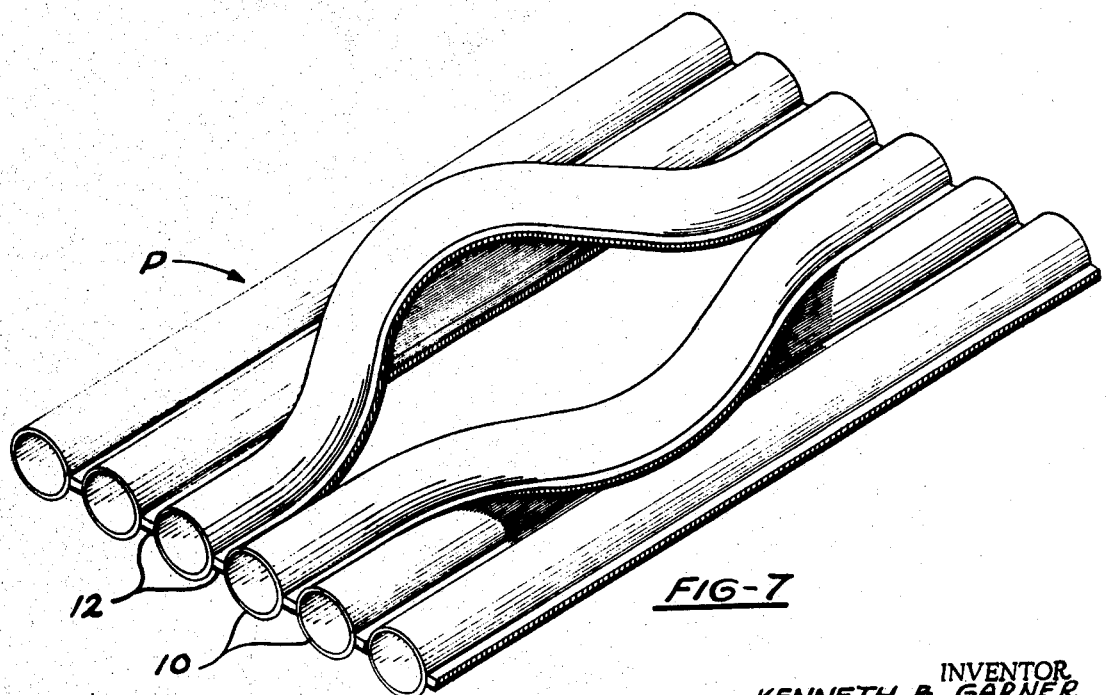
FIG. 7 is a perspective view of tubular welded wall panel having an opening formed therein by the apparatus of this invention.

The operation of the apparatus is as follows: Tube panel P is directed between the upper and lower frames 48, 80 of the apparatus 44. Segments 14, 14', 16 are removed from the interconnecting web portions 12 about the tubes between which the desired opening is to be formed as the tube panel P passes beneath the guide arrangement 18. The segments 14, 14', 16 may be removed by a torch burning means (not shown) integral with the apparatus 44, plunge cutting and milling or any other appropriate means. The guide arrangement carriage 50 and the cylinder support plate 82 are longitudinally moved along tracks 48 and 102 respectively, so as to be properly positioned with respect to the tubes of panel P between which the desired opening is to be formed. Particularly shaped grooved guides 20 are positioned in the support block 72 by sliding the T bars 66 thereof into the grooves 70 of the support block 72. The particular shape of the guides 20 and their included angle is dependent upon the size and thickness of the tubing and the width of the desired opening. Cylinder 56 is actuated so that rod 58 will position the guide arrangement supporting frame 64 and the guides 20 has attached thereto in proper guiding relationship with the tubes of panel P between which the desired opening is to be formed. Hydraulic cylinders are oriented in grooved tracks 84 so that the die means 22 are in complementary cooperating relationship with respective guides 20. The shape of the dies 22 and guides 20 are dependent upon the size and thickness of the tubing and the width of the desired opening. The hydraulic cylinders 86 are alternately activated so that one tube and then the other is bent and stretched so as to form the desired opening in the panel P by the action of piston rod 94 forcing the die support 24 and its corresponding die 22 between the complementary opposed guides 20. A particular finished panel portion having a desired opening formed therein is shown in FIG. 7. If plural openings are desired in a particular panel, it is only required that the panel be reoriented beneath guide arrangement so as to properly locate the tubes between which the next desired opening is to be formed.

Thus it can be seen that there has been invented a simple and efficient apparatus for accomplishing the novel method of application No. 751,782 which eliminates the need for intricate specialized welding equipment or expensive time consuming hand welding techniques. By this arrangement a tubular welded wall panel of standard configuration may be operated upon in a continuous manner to form all the openings desired therein. The panel is merely properly located between the guide arrangement and the hydraulic jack actuated dies and the opening is formed by the alternate actuation of these jacks to force the dies into cooperative relationship with the complementary shaped guides of the guide arrangement. By particularly choosing the shape of the guides and dies and selecting the angle at which the guides and dies operate on the tube, the desired tubes can be bent and stretched to form the openings with limited stretching and flattening of the tubes. When it is desired to operate on a panel consisting of tubes of a size different from previous panel operated upon, or the dimensions of the desired openings are changed, the guides and dies are interchangeable and their angle of operation is easily adjustable. Additionally by the provision of an interconnecting web segment removing means integral with the opening forming apparatus, a unitary device is obtained requiring substantially no additional equipment to form the required openings in tubular welded wall panels.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. An apparatus for forming openings in tubular welded wall panels comprising: a means for removing the portions of the weld connections connecting the tubes through which the opening is to be formed, an adjustment guide arrangement, a means for orienting said guide arrangement with respect to said tubes through which the opening is to be formed so as to guide said tubes upon movement thereof out of the plane of the wall panel, actuating means for forming said opening in the wall panel by causing the interaction of the tubes through which the opening is to be formed with said guides.

2. The apparatus of claim 1 wherein the actuating means comprises a first die member opposed to a first portion of said guide arrangement, a second die member opposed to a second portion of said guide arrangement, jack means alternately forcing said first die member against said first guide arrangement portion and said second die member against said second guide arrangement portion to stretch and bend the tubes of the tubular welded wall panel placed therebetween to form the opening therein.

3. The apparatus of claim 2 wherein said first guide arrangement portion and said first die member, and said second guide arrangement portion and said second die member, respectively, comprise grooved rollers and complementary opposed grooved portions so as to maintain the shape of the tube acted upon therebetween.

References Cited
UNITED STATES PATENTS 1,899,280  2/1933  Lidseen _____ 72—380

CHARLES W. LANHAM, Primary Examiner

R. M. ROGERS, Assistant Examiner

U.S. Cl. X.R.

29—157.3; 72—384; 113—118